US007307763B2

(12) United States Patent
Yamamoto

(10) Patent No.: US 7,307,763 B2
(45) Date of Patent: Dec. 11, 2007

(54) IMAGE PROCESSING METHOD

(75) Inventor: Hiroyasu Yamamoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 849 days.

(21) Appl. No.: 10/255,070

(22) Filed: Sep. 26, 2002

(65) Prior Publication Data

US 2003/0081955 A1 May 1, 2003

(30) Foreign Application Priority Data

Sep. 26, 2001 (JP) ............................ 2001-293198

(51) Int. Cl.
*H04N 1/04* (2006.01)

(52) U.S. Cl. ....................... 358/474; 358/1.9; 358/520; 358/527; 358/3.27; 382/167; 382/162; 382/254

(58) Field of Classification Search ................ 358/1.9, 358/517, 520, 3.27, 474, 512, 527; 382/167, 382/162, 254

See application file for complete search history.

(56) References Cited

U.S. PATENT DOCUMENTS 3,842,587 A * 10/1974 Strauss et al. .............. 396/242
4,390,882 A * 6/1983 Ohara et al. ................ 347/253
4,994,662 A * 2/1991 Funahashi et al. ....... 250/208.1
5,278,669 A * 1/1994 Takemoto ................... 358/453
6,023,532 A * 2/2000 Kanesaka et al. ........... 382/274
6,674,544 B2 * 1/2004 Shiota et al. ................ 358/1.9
6,748,109 B1 * 6/2004 Yamaguchi ................. 382/167
6,876,467 B1 * 4/2005 Yamaguchi ................. 358/1.9
2001/0012096 A1 * 8/2001 Haraguchi et al. ............ 355/40

* cited by examiner

*Primary Examiner*—Douglas Q. Tran
*Assistant Examiner*—Negussie Worku
(74) *Attorney, Agent, or Firm*—Sughrue Mion, PLLC

(57) ABSTRACT

The image processing method includes successively acquiring image data of images of a plurality of frames, changing a timing with which determination of an image processing condition is started in accordance with contents of the images carried by the acquired image data, determining the image processing condition for each of the frames based on the timing using the image data of the images of the frames and performing image processing in accordance with the thus determined image processing condition to output data for output purposes. The image processing condition of each frame can be determined rapidly in a correct or proper manner in a digital laboratory system, and the workability or the productivity of print output or image file output can be improved.

22 Claims, 6 Drawing Sheets

IMAGE PROCESSING METHOD

BACKGROUND OF THE INVENTION

1. Field of the Invention

The present invention relates to a technical field of an image processing method and mainly image processing utilized in a digital laboratory system, and more particularly, to an image processing method which enables rapid and correct or proper determination of an image processing condition of each frame whereby a high-quality image can be output efficiently.

2. Description of the Related Art

Nowadays, so-called direct exposure for projecting an image on a photographic film (hereinafter, referred to simply as a film) onto a photosensitive material (photographic paper) so as to expose the image is a main technique in printing of an image photographed on the film such as a negative film or a reversal film onto a photosensitive material.

In contrast, a printer utilizing digital exposure, that is, a digital laboratory system has recently been put into practice. In the digital laboratory system, an image recorded on a film is photoelectrically read out. The readout image is converted to a digital signal, which is then subjected to various image processings so as to obtain image data for recording. A photosensitive material is subjected to scanning exposure with recording light which is modulated in accordance with the thus obtained image data so as to record an image (latent image), thereby obtaining a (finished) print.

According to the digital laboratory system, since processing of image data serves as image processing (optimization), a high-quality print which was not obtainable with conventional direct exposure can be acquired. Moreover, not only an image photographed on a film, but an image photographed with a digital camera or the like can also be output as a print. Furthermore, an image is processed as digital image data, not only a photographic print is obtained, but also image data can be output to a recording medium such as a CD-R as an image file.

Such a digital laboratory system basically includes: a scanner (image reader) for photoelectrically reading an image recorded on a film by irradiating a film with reading light and reading its projected light; an image processor for performing predetermined image processing on the image data read out by the scanner so as to obtain image data for image recording, i.e., exposure condition; a printer (image recorder) for exposing a photosensitive material through, for example, light beam scanning, in accordance with the image data output from the image processor so as to record a latent image; and a processor (developing apparatus) for performing development processing on the photosensitive material which is exposed in the printer so as to obtain a (finished) print.

In such a digital laboratory system, the image processing condition for each frame (each image) is determined by image analysis using image data (prescan data) obtained by prescanning for roughly reading out an image prior to fine scan, that is, image reading for output (hereinafter, the determination of image processing conditions is referred to as "setup").

Moreover, in order to further improve the productivity and the working efficiency, a laboratory system dedicated to fine scan without performing prescan has been recently developed. In this system, the setup of each frame is executed by performing image analysis using image data obtained by thinning fine scan data.

The setup is conventionally performed by using only the image data of a frame of interest. In these days, on the other hand, the setup is performed by using image data of a plurality of frames in order to perform the image processing at a higher accuracy, preventing the image-quality degradation and the like due to color failure occurring in images photographed on the lawn and the like.

For example, in a certain digital laboratory system, the setup for each frame is performed by using image data for one order (normally, a roll of film). In this method, after completion of image reading for one order, the processing is executed in the order of setup, display of a monitoring image (expected finished image=simulation image) and a monitoring operation.

In this method, however, a waiting time period from the setting of a film by an operator until the start of the monitoring operation is long. Therefore, the productivity and the working efficiency are poor.

On the other hand, another way of the setup of frame can be conceived. At the time when the reading of a predetermined number of frames is finished, the setup for each frame is performed by using the image data of all the frames which have been obtained by this point of time. Thereafter, at each time one frame is read out, the image data of the frame is added to the previously readout image data so as to execute the setup of the frame. With this method, a time period until the start of the monitoring operation can be reduced, allowing the efficient operation. However, since the number of frames used for the setup is limited, the accuracy of image processing (correction performance) is sometimes lowered; for example, if the first several frames contain the successive scenes on the lawn, the color failure occurs, giving a magenta tone to the image.

SUMMARY OF THE INVENTION

An object of the present invention is to solve the prior art problems described above by providing an image processing method which is utilized for a digital laboratory system and the like, which is capable of rapidly determining an image processing condition of each frame in a correct or proper manner and consequently outputting a high-quality image obtained by performing proper image processing, which requires less time between the setting of a film and the start of monitoring (verification) even if the monitoring is to be executed, and which also ensures excellent productivity and workability.

In order to attain the object described above, the first aspect of the present invention provides an image processing method comprising the steps of: successively acquiring image data of images of a plurality of frames; changing a timing with which determination of an image processing condition is started in accordance with contents of the images carried by the acquired image data; determining the image processing condition for each of the plurality of frames based on the timing using the image data of the images of the plurality of frames; and performing image processing in accordance with the thus determined image processing condition to output data for output purposes.

In order to attain the object described above, the second aspect of the present invention provides an image processing method comprising the steps of: successively acquiring first image data of first images; selecting second image data of second images of a plurality of frames taken with a photographing device of a single model from the acquired first image data of the first images; changing a timing with which determination of an image processing condition is started in accordance with contents of the second images carried by the thus selected second image data; determining the image processing condition for each of the plurality of frames based on the timing using the thus selected second image data of the second images of the plurality of frames; and performing image processing in accordance with the thus determined image processing condition to output data for output purposes.

In order to attain the object described above, the third aspect of the present invention provides an image processing method comprising the steps of: performing prescan for photoelectrically reading images of a plurality of frames taken on a photographic film in a rough manner prior to performing fine scan for photoelectrically reading the images of the plurality of frames taken on the photographic film for output purposes to thereby acquire image data of the images of the plurality of frames; changing a timing with which determination of an image processing condition is started in accordance with contents of the images carried by the acquired image data; determining the image processing condition for each of the plurality of frames based on the timing using the image data of the images of the plurality of frames acquired by the prescan; and processing fine scan data obtained by the fine scan in accordance with the thus determined image processing condition to output data for output purposes.

In the image processing of each aspect of the present invention, it is preferable the determination of the image processing condition of the image data of each of the images of the plurality of frames is started in at least one of four cases: a first case where gray pixels are extracted from the acquired or selected image data of each of the images of the frames for accumulation and the accumulated gray pixels exceed a predetermined number; a second case where predetermined pixels in the image data of each of the images of the frames accumulated with respect to a density axis have a density range exceeding a predetermined width; a third case where predetermined pixels in the image data of each of the images of the frames accumulated with respect to a color distribution axis have a color distribution exceeding a predetermined width; and a fourth case where an end of a continuous scene is confirmed as a result of a scene analysis of the image data of each of the images of the frames.

Preferably, as for image data acquired or selected after the predetermined number of gray pixels are accumulated, the image processing condition is determined by adding gray pixels of the acquired or selected image data to the gray pixels having been accumulated theretofore, or as for image data acquired or selected after the density range or the color distribution has a width exceeding the predetermined width, the image processing condition is determined by adding predetermined pixels of the image data to the predetermined pixels having been accumulated theretofore.

Preferably, when the gray pixels are accumulated for a predetermined number of frames, gray pixels of one frame having been accumulated theretofore are deleted to accumulate gray pixels of a new frame, or when the predetermined pixels are accumulated with respect to the density axis or the color distribution axis for a predetermined number of frames, pixels of one frame having been accumulated theretofore are deleted to accumulate pixels of a new frame, whereby a number of frames for which pixels used for determining the image processing condition afterwards are accumulated is made constant.

Preferably, the gray pixels of each of the frames are judged by using highlight color balance and shadow color balance of the image data of the frames.

Preferably, the gray pixels of each of the frames are judged by using characteristic information of a photographic film previously given.

Preferably, the width of the density range or the color distribution is evaluated by a degree of dispersion of a number of the pixels accumulated with respect to the density axis or the color distribution axis.

Preferably, the end of the continuous scene of the image data of each of the images of the frames is determined based on a similarity in a histogram or an average density of the image data of each of the images of the frames.

DESCRIPTION OF THE PREFERRED EMBODIMENTS

Hereinafter, an image processing method of the present invention will be described below in detail based on preferred embodiments illustrated in the accompanying drawings.

Figure 1:
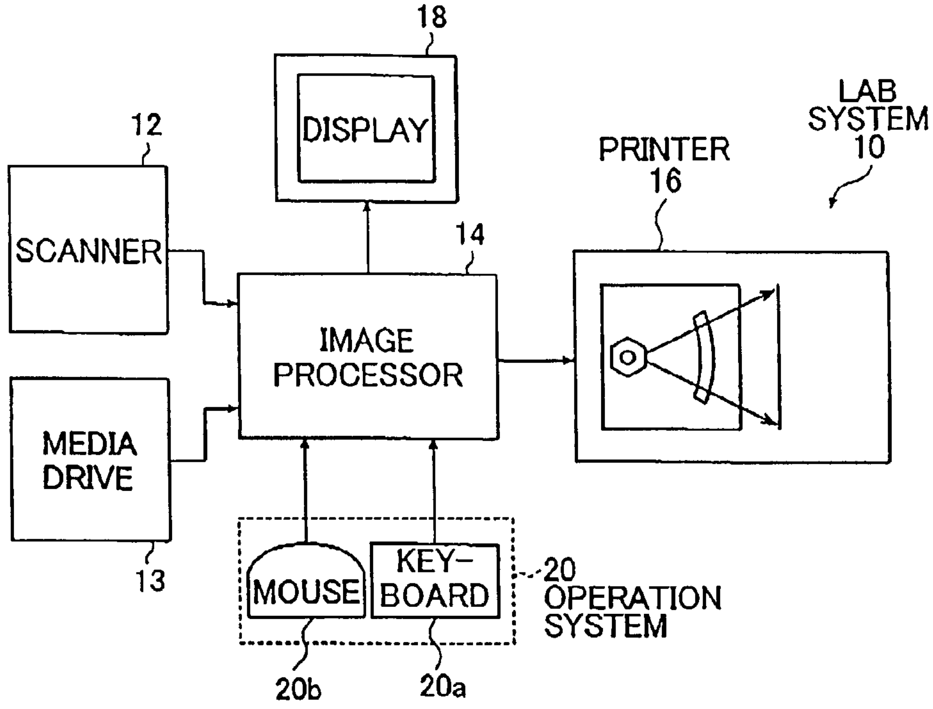
FIG. 1 is a block diagram showing an example of a (digital) laboratory system utilizing an image processing method of the present invention.

FIG. 1 is a block diagram showing an example of a digital laboratory system utilizing the image processing method of the present invention.

A digital laboratory system 10 (hereinafter, referred to simply as a lab system 10) shown in FIG. 1 photoelectrically reads an image taken on a film F or reads out an image taken with a digital camera or the like and outputs a print on which the taken image is reproduced. The lab system 10 basically comprises a scanner 12, a media drive 13, an image processor 14, a printer 16, a display 18 connected to the image processor 14, and an operation system 20 (a keyboard **20*a* and a mouse 20*b***).

On the keyboard **20*a***, various adjustment keys such as adjustment keys for the respective colors of C (cyan), M (magenta) and Y (yellow), a density adjustment key and a γ (gradation) adjustment key are placed.

Figure 2:
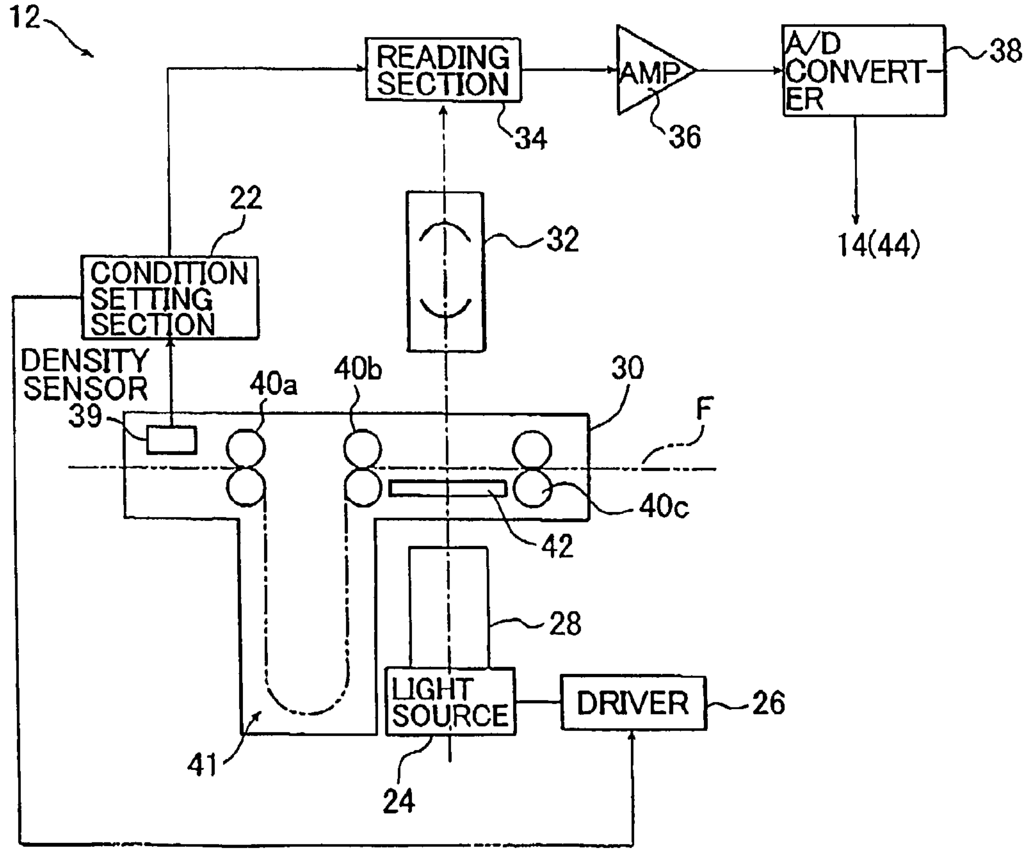
FIG. 2 is a conceptual view showing an example of a scanner included in the laboratory system shown in FIG. 1.

The scanner 12 is for photoelectrically reading out the image photographed on the film F. As schematically shown in FIG. 2, the scanner 12 includes a condition setting section 22, a light source 24, a driver 26, a diffusion box 28, a carrier 30, an imaging lens unit 32, a reading section 34, an amplifier 36, and an A/D (analog/digital) converter 38.

In the scanner 12 shown in the drawing, the light source 24 utilizes LEDs (Light Emitting Diode), in which three types of LED respectively emitting R (red) light, G (green) light and B (blue) light are arranged. The light source 24 may have the arrangement including an LED emitting infrared (IR) light for detecting a foreign matter adhered to the film F, a flaw of the film F and the like. Such a light source 24 is driven by the driver 26 so as to sequentially emit light of the respective colors upon image reading.

The light emitted from the light source 24 enters the diffusion box 28. The diffusion box 28 serves to uniformize the light incident on the film F in a film plane direction.

The carrier 30 interruptedly conveys the film F so as to sequentially convey and hold each image (each frame) photographed on the film F to a predetermined reading position. A plurality kinds of carriers are prepared as the carrier 30 in accordance with the film size and the like. The carrier 30 is constituted so as to be removably attached to a main body of the scanner 12.

In the illustrated example, the carrier 30 includes a density sensor 39, pairs of carrying rollers 40 (40*a*, 40*b* and 40*c*), and a mask 42 limiting a readout region of each frame at the predetermined reading position. On the carrier 30, a bar code reader for reading a bar code such as a DX code, a magnetic head (for APS) for reading a magnetic recording medium of an APS film and the like are placed. The readout information is sent to a predetermined site of the lab system 10.

The density sensor 39 is for measuring a density of an image of each frame photographed on the film F prior to conveying the film to the reading position. The result of density measurement with the density sensor 39 is sent to the condition setting section 22.

In the illustrated example, by way of example, the condition setting section 22 judges a state of a negative film from the result of density measurement with the density sensor 39 so as to perform, normally, the image reading (fine scan) under a preset predetermined reading condition. For a frame judged as an overexposure (excessively exposed) negative film, the condition setting section 22 sets a reading condition of fine scan in accordance with the film to send a direction to the driver 26 and the reading section 34. As described below, the lab system 10 does not perform the prescan.

The pairs of carrying rollers 40 convey the film F illustrated as a double dotted line in a longitudinal direction so as to sequentially convey and hold the film F to the predetermined reading position frame by frame. The pairs of carrying rollers 40*b* and 40*c* are placed so as to interpose the reading position (the mask 42) therebetween in a conveying direction. A loop formation section 41 for holding the film F in a loosened state is set between the pairs of carrying rollers 40*a* and 40*b*. The above-described density sensor 39 is placed at the upstream of the conveying direction of the pair of carrying rollers 40*a*.

In the carrier 30 in the illustrated example, the density sensor 39 performs the density measurement of each frame while the pair of carrying rollers 40*a* are continuously conveying the film F. The film F of the frame whose density has been measured is temporarily housed in the loop formation section 41. Then, the film F is interruptedly conveyed by the pairs of carrying rollers 40*b* and 40*c*, so that each frame is sequentially conveyed to the reading position from the loop formation section 41 to the reading position in a frame-by-frame manner.

The imaging lens unit 32 is for imaging the projected light of the film F on a light-receiving face of the reading section 34. The reading section 34 photoelectrically reads out the film F by using an area CCD sensor so as to read the entire surface of one frame which is limited by the mask 42 of the carrier 30 (image reading by means of plane exposure).

In such a scanner 12, for normal reading of the film F (for example, simultaneous printing), the film F is first conveyed by the pairs of carrying rollers 40 of the carrier 30 so as to convey the first frame (or the final frame) to the reading position.

At the time of this conveyance, the density measurement is performed on the frame which has passed through the density sensor 39. The condition setting section 22 judges a state of the negative film and further sets the reading condition as the need arises. When the first frame is conveyed to the reading position, the movement of the pairs of carrying rollers 40*b* and 40*c* stops whereas the pair of carrying rollers 40*a* continues conveying the film F so as to perform the density measurement and the like for each frame with the density sensor 39. As described above, the film F whose density has been measured is housed in the loop formation section 41.

When the first frame is carried to the reading position, the driver 26 drives, for example, the LED of R included in the light source 24 so as to emit R light. After the amount of R light is uniformized in a plane direction of the film F by the diffusion box 28, the R light is irradiated onto the reading position so as to be incident on the frame held thereto. The incident R light transmits through the frame to become projected light bearing an R image of the image photographed on the frame. The projected light forms an image at a predetermined position (on the light-receiving plane of the area CCD sensor) of the reading section 34 by the imaging lens unit 32, whereby the R image of the frame is photoelectrically read out.

In a similar manner, the LEDs of G and B included in the light source 24 are sequentially driven to emit light of G and B so as to read out a G image and a B image of the frame, thereby completing the reading of this frame.

An output signal from the reading section 34 is amplified in the amplifier 36 and then converted to a digital image signal by the A/D converter 38 so as to be output to the image processor 14 (data correction section 44).

Upon completion of reading of the first frame, the pairs of carrying rollers 30*b* and 30*c* of the carrier 30 convey the film F so as to bring a next frame to be read out to the reading position, so that the next frame is read out in a similar manner.

In the lab system 10 in the illustrated example, the scanner 12 basically performs the image reading of all frames of one order (normally, a roll of film) in a continuous manner.

In a normal digital laboratory system, image reading is performed twice for each frame, that is, fine scan for reading out an image at a high resolution for outputting a print or the like, and prescan, which is performed prior to the fine scan, for reading out the image at a low resolution so as to determine the reading condition or the image processing condition of the fine scan.

On the other hand, in the lab system 10 in the illustrated example, the setting of the image processing condition, the production of the monitoring or verification image or the like is performed using image data of fine scan (fine scan data) by performing no prescan but fine scan, as a preferred embodiment suitably providing the effects of the present invention. The reading condition in fine scan is as described above.

In the digital laboratory system utilizing the image processing method of the present invention, the scanner (image reading means) uses individual LEDs for R, G and B or R, G, B and IR in the light source and an area CCD sensor as the image sensor. However, this is not the sole case of the present invention. The light source used may be a combination of a white light source or a white light source having a light-emitting range also covering IR range with filters for R, G and B or R, G, B and IR. Alternatively, instead of the area sensor described above, the scanner may include a three-line CCD sensor for reading R, G and B images or a four-line CCD sensor for also reading an IR image in addition to the R, G and B images, thereby reading the images by the so-called slit scanning.

As described above, the digital image signal output from the scanner 12 is input to the image processor 14. The lab system 10 may alternatively acquire the image data (image file) directly from a digital camera, from various types of image data storage media through the media drive 13, or from a communication network such as Internet so that the image data is processed in the image processor 14 in a similar manner.

The media drive 13 read out the image data (image file) from image data storage media including SmartMedia, a memory card, an MO (magneto-optical recording medium), an FD (flexible disc), a portable HD (removable hard disc), a CD (compact disc) and a CD-R (recordable compact disc) and can also write the image data thereto as required.

Figure 3:
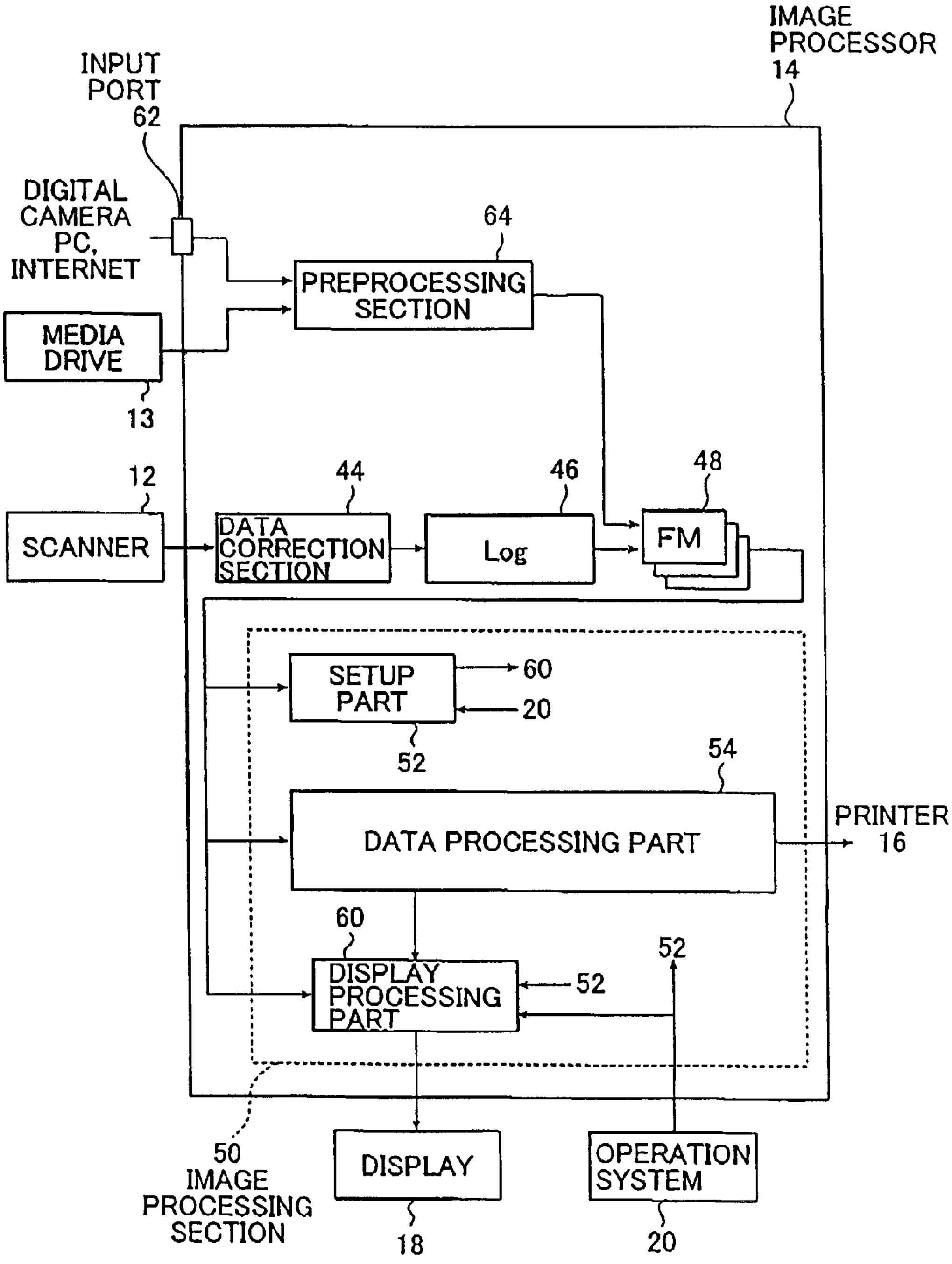
FIG. 3 is a block diagram showing an example of an image processing section included in the laboratory system shown in FIG. 1.

FIG. 3 is a block diagram showing an example of the image processor 14.

The image processor 14 is for carrying out the image processing method of the present invention, and includes, as conceptually shown in the block diagram of FIG. 3, the data correction section 44, a Log converter 46, frame memories 48 (hereinafter, abbreviated as FMs 48), an image processing section 50, an input port 62 and a preprocessing section 64.

The data correction section 44 performs predetermined corrections such as DC offset correction, dark correction and shading correction on each of the R, G, and B image signals output from the scanner 12.

The Log converter 46 performs Log conversion by means of, for example, an LUT (look-up table), on the image signals processed in the data correction section 44 so as to obtain digital image (density) data (fine scan data).

On the other hand, the input port 62 is a port for directly receiving digital image data from a digital camera such as a digital still camera (DSC) or a digital video camera, a personal computer (PC) or a communication network such as Internet.

The digital image data input to the input port 62 and the digital image data read out from a medium through the media drive 13 are then input to the preprocessing section 64.

The preprocessing section 64 performs format conversion of the input digital image data to digital data having the same format as that of the digital image (density) data (fine scan data) obtained by performing corrections in the data correction section 44 and conversion in the Log converter 46. Therefore, the digital image data obtained by the conversion in the preprocessing section 64 can be processed in the same manner as the digital image (density) data (fine scan data) obtained by performing corrections in the data correction section 44 and conversion in the Log converter 46.

It should be noted here that in the case of image data of images taken with a digital camera or the like and recorded onto a medium or image data input through a personal computer or a communication network, one medium or a series of image data for one order contains images taken with a plurality of models of cameras. Therefore, in the present invention, it is preferable to previously classify image data of images for each camera model or perform other preprocessing. In such preprocessing, image data of images can be classified for each camera model making use of camera model information in the Exif tag within the Exif format of image file (image data) input from a medium.

When a still image is extracted from a moving image taken with a digital camera or a moving image in a movie and incorporated into the image processor 14 to implement the image processing method of the present invention, the still image is also subjected to format conversion in the preprocessing section 64, where other processing operations are performed as required. The digital image data of the still image obtained after the preprocessing in the preprocessing section 64 can be processed in the same manner as the fine scan data obtained by performing the corrections in the data correction section 44 and the conversion in the Log converter 46.

Each of R, G, and B image data obtained by performing the conversion in the Log converter and the preprocessing section 64 is stored in each of the FMs 48.

In the lab system 10, the scanner 12 basically performs the image reading of all frames of one roll of film F or all frames of one medium in a continuous manner. In correspondence with this continuous reading, each of the FMs 48 has a capacity of storing image data (fine scan data) of one medium or one roll of film (for example, image data for 40 frames, which is the maximum number of frames for a currently used film).

The image data of each frame stored in the FMs 48 is subjected to image processing by the image processing section 50.

In the illustrated example, the image processing section 50 includes a setup part 52, a data processing part 54, and a display processing part 60.

The setup part 52 reads out the image data (fine scan data) stored in the FMs 48 so as to perform predetermined processing such as data thinning to thereby obtain low resolution digital image data equivalent to general prescan data. Thereafter, the image analysis is performed for each frame to determine the image processing condition in the data processing part 54 (hereinafter, as previously described, the determination of image processing condition is referred to as setup) so as to set the image processing condition to the data processing part 54.

The setup part 52 performs the determination of the image processing condition, the setting of the image processing condition to the data processing part 54, the correction of the image processing condition set to the data processing part 54, and the like so as to execute the adjustment in accordance with key adjustment which is input on monitoring.

In the present invention, the setup part 52 Starts the setup of each frame by using image data of all frames at the time when the setup part 52 acquires image data of the number of frames which reaches a sufficient amount of data in accordance with the state of the image. According to the image processing method of the present invention, setup of each frame can be rapidly performed in a correct or proper manner and good working efficiency and output of a high-quality image obtained by performing proper image processing is realized in a compatible manner.

As described below, in the illustrated example, a gray pixel is extracted from the thinned image data of each frame. The extracted gray pixels are sequentially accumulated from the first frame. At the time when the number of accumulated gray pixels exceeds a predetermined number, the setup for each frame is started from the first frame by using all the gray pixels thus accumulated and the like. For a frame after the number of gray pixels exceeds a predetermined number, the image data of the frame is added to the gray pixels accumulated by then so as to perform the setup of this frame.

As described below in further detail, in the present invention, the setup start in the setup part 52 is not limited to the time when the number of accumulated gray pixels exceeds a predetermined number, but may depend on at least one of the following three cases: When predetermined pixels in the image data of the image of each frame as accumulated with respect to the density axis have a density range exceeding a predetermined width; when predetermined pixels in the image data of the image of each frame as accumulated with respect to the color distribution axis have a color distribution exceeding a predetermined width; and when the end of a continuous scene is confirmed by the scene analysis of the image data of the image of each frame.

Other setup operations than the above-mentioned operations in the setup part 52 may be performed in a known method in accordance with the image processing to be executed.

The data processing part 54 performs predetermined image processing on the image data of each frame in accordance with the image processing condition determined by the setup part 52 so as to output the image data to the printer 16 as image data corresponding to the output from the printer 16.

The image processing performed in the data processing part 54 is not particularly limited; various known image processings are given as examples. Specific examples include electronic magnification processing (enlargement/reduction processing), negative/positive conversion, gray-scale balance correction, density correction, contrast correction, underexposure/overexposure correction, dodging processing (compression processing of an image dynamic range), sharpness processing (sharpness emphasizing processing), graininess suppressing processing, soft focus processing, red-eye correction processing, cross filter processing, and special finishing processing such as black-and-white finishing and sepia finishing. In the illustrated example, the conversion processing of an image color space employing a 3D-LUT (three-dimensional look-up table) and the like so as to convert an image data to image data corresponding to the output to the printer 16 or the output of an image file is also performed.

The display processing part 60 reads out the image data of each frame from the FMs 48 and thins the image data to a predetermined size. The display processing part 60 also receives information of the set image processing condition from the setup part 52 so as to produce a monitoring image (expected finished image=simulation image) of each frame. The display processing part 60 uses the 3D-LUT or the like to convert the monitoring image into image data corresponding to image display by the display 18 so as to display the monitoring image on the display 18. The display processing part 60 changes (adjusts) a display image on the display 18 so as to obtain an image corresponding to the key adjustment which is input by an operator upon monitoring.

The printer 16 is a known color printer. For example, the following printer is shown as an example; a printer in which a photosensitive material such as a photographic paper is subjected to two-dimensional scanning exposure with a light (laser) beam modified in accordance with the supplied R, G, and B image data so as to record a latent image, and after the exposed photosensitive material goes through wet development processing including development/fixation/water rinsing to make the latent image visible, the photosensitive material is dried and output as a print.

In the illustrated lab system 10, instead of outputting the image as a print, for example, the image data may be converted into an image file in a JPEG format so that the thus converted data can be recorded onto a CD-R or other various types of media as an image file through the media drive 13 or output to a personal computer or a communication network such as Internet.

Hereinafter, an example of the functions of the scanner 12 and the image processor 14 will be described with reference to FIGS. 4A and 4B so as to describe further in detail the image processing method of the present invention.

The image processing method of the present invention will be described below with reference to a typical example in which an image of a frame of a film is photoelectrically read with the scanner 12 to obtain image data of the frame image which is then subjected to the setup performed in the setup part 62 of the image processor 14 at the time when a predetermined number of gray pixels are accumulated. However, it is to be understood that the present invention is not limited to this case.

The lab system 10 has two types of processings, that is, with the monitoring for displaying a monitoring image so as to adjust an image, and without such monitoring. First, the case where the monitoring is not performed will be described with reference to FIG. 4A.

As mentioned above, in the scanner 12, the image reading (fine scan) of all frames for one order is continuously performed. Therefore, in the above-described manner, image reading from the first frame to, for example, the 24th frame is sequentially executed.

An image signal of each frame read by the scanner is sequentially supplied to the image processor 14. Then, the image signal is processed frame by frame in the data correction section 44 and the Log converter 46 so as to be stored as image data (fine scan data) in the FMs 48.

When the image data of the first frame is stored in the FMs 48, the setup part 52 reads out the image data, thins pixels to a predetermined size, and extracts a gray pixel of this frame.

A method of extracting a gray pixel is not particularly limited, and therefore known methods can be used. For example, a method of extracting a gray pixel by utilizing shadow color balance and highlight color balance is given as an example. As a more specific example, a method in which a shadow and a highlight of the frame are extracted, which are both plotted on the three-dimensional coordinates of R, G and B, and the pixels falling within a predetermined range with respect to an axis (straight line) obtained by connecting the shadow and the highlight are judged as gray pixels can be given.

As described above, the scanner 12 reads out the DX code or the magnetic information (in the case of APS) of the film F to send various information to a predetermined site. Since the kind of film (maker, brand, grade or the like) can be judged from the information, the characteristics (gray curve or the like) may be learned and memorized in advance for various films so that the gray pixels of each frame are extracted by using the film characteristics.

If the image data of the second frame is stored in the FMs 48 after extraction of the gray pixels of the first frame, the setup part 52 reads out and thins the image data in the same manner so as to extract the gray pixels of the second frame. The setup part 52 adds the extracted gray pixels of the second frame to the gray pixels of the first frame. Thereafter, the gray pixels of each frame are extracted and accumulated in the same manner for the third frame, the fourth frame, and so on.

The setup part 52 sequentially starts the setup of the readout frame at the time when the number of the thus accumulated gray pixels exceeds a predetermined number.

In the illustrated example, it is assumed that the number of accumulated gray pixels exceeds a predetermined number (reaches a sufficient number) at the fourth frame as an example. Accordingly, the setup part 52 uses the thinned image data to execute the image analysis from the first frame so as to perform the setup of the first frame by using the image data for four frames such as all the accumulated gray pixels. Thereafter, in a similar manner, the setup is sequentially performed from the second frame, the third frame, up to the fourth frame. The image processing condition of each of the setup frames is sequentially set to the data processing part 54.

A sufficient number of accumulated gray pixels is not particularly limited. An appropriate number of pixels corresponding to the system may be suitably set in accordance with the target image quality, the processing capability required for the lab system 10 and the like. Even if the number of accumulated pixels reaches a predetermined number, in the case where gray pixels within a density range sufficiently filling the density range (dynamic range) to be reproduced on the print are not obtained, more gray pixels are preferably accumulated so as to compensate for an insufficient number of gray pixels.

Moreover, in the present invention, in order to prevent the color balance from being lost due to difference in type of the light source, the gray pixels of two or more frames are accumulated to perform the setup even in the case where a sufficient number of gray pixels are obtained with the first frame. In such a case, the number of frames is not limited; in the same manner as described above, an appropriate number of frames in accordance with the system may be suitably set.

As the image processing for performing the setup by utilizing a plurality of frames, various known image processings can be used.

In the illustrated example, the setup of gray-scale balance correction for reproducing an image with the appropriate color balance is performed by using all the accumulated gray pixels. As a result, in consideration of the film characteristics and the characteristics common in one entire order due to development processing, a time lapse and the like in addition to the characteristics of the frame, more appropriate and highly accurate gray-scale balance correction can be performed. This image processing and the extraction of gray pixels are described in JP 11-317880 A by the applicant of the present invention.

Upon setting of the image processing conditions from the first frame to the fourth frame, the data processing part 54 reads out the image data from the FMs 48 sequentially from the first frame. The data professing part 54 performs the image processing in accordance with the set image processing conditions (production of output images) so as to sequentially output the image data to the printer 16 as the image data for printer output.

On the other hand, the setup part 52, which has completed the setup up to the fourth frame, reads out image data of the fifth frame from the FMs 48 if the image data of the fifth frame is stored therein. In a similar manner, gray pixels are extracted to be added to the accumulated gray pixels. Then, the setup of the fifth frame is performed by using all the accumulated gray pixels and the like so as to set the image processing condition to the data processing part 54. The data processing part 54, to which the image processing condition of the fifth frame is set, reads out the image data of the fifth frame from the FMs 48 to perform the image processing, thereby outputting it to the printer 16 as image data for printer output.

From thereon, the setup part 52 similarly reads out the image data of the sixth frame to execute the extraction and the accumulation of gray pixels, the setup of the sixth frame, and the setting of the image processing condition so that the data processing part 54 performs the image processing on the image data of the sixth frame to output the image data to the printer 16. The seventh frame, the eighth frame and up to the 24th frame are processed in the same manner to output to the printer 16 as image data for output.

Next, the functions of the lab system in the case where the monitoring is performed will be described with reference to FIG. 4B.

Figure 4A:
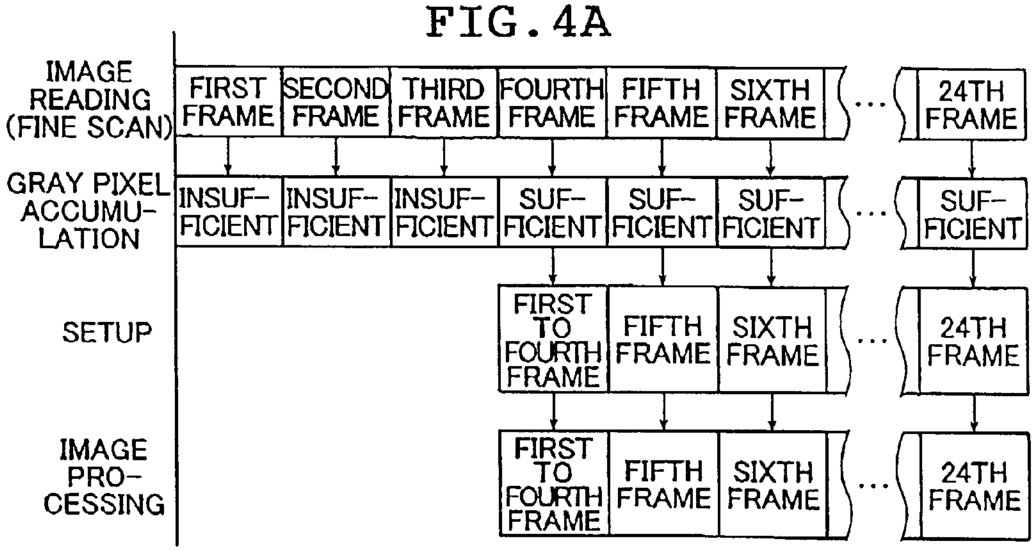
FIGS. 4A and 4B are diagrams for illustrating examples of a sequence of the image processing method of the present invention.

In a similar manner as in the processing without monitoring shown in FIG. 4A, the scanner 12 sequentially performs the image reading (fine scan) from the first frame to, for example, the 24th frame. An image signal of each of the frames is sequentially supplied to the image processor 14, which is then processed in the data correction section 44 and the Log converter 46 so as to be stored as image data (fine scan data) in the FMs 48.

Upon the storage of the image data in the FMs 48, the setup part 52 sequentially reads out the image data from the first frame to extract and accumulate gray pixels in the same manner.

Also in this example, it is assumed that the number of accumulated gray pixels exceeds a predetermined number at the fourth frame. The setup part 52 uses thinned image data to execute the image analysis from the first frame up to the fourth frame so as to perform the setup of each frame by using all the accumulated gray pixels and the like, thereby setting the image processing condition to the data processing part 54.

When the setup part 52 performs the setup of the first frame to the fourth frame, the display processing part 52 reads out the image data of the first frame to the fourth frame from the FMs 48 while reading out the image processing conditions of the first frame to the fourth frame from the setup part 52. The display processing part 52 performs thinning and image processing and the like corresponding to the readout image processing conditions so as to sequentially produce the monitoring images of the first frame to the fourth frame to be displayed on the display 18. In accordance with the display of the monitoring images, the first frame to the fourth frame undergo the monitoring.

In accordance with input of keys such as the above-described color adjustment key or γ adjustment key, the setup part 52 executes the determination of the image processing conditions, the setting of the image processing conditions to the data processing part 54, the correction of the previously set image processing conditions, and the like.

When monitoring of the first to the fourth frames is completed so that an instruction to output the image (monitoring OK) is input, the data processing part 54 sequentially reads out the image data from the FMs 48 sequentially from the first frame to perform the image processing in accordance with the set image processing conditions (production of output images), thereby sequentially outputting the image data to the printer 16 as image data for printer output.

On the other hand, the setup part 52, which has completed the setup up to the fourth frame, similarly reads out the image data of the fifth frame from the FMs 48 if it exists. Then, the setup part 52 performs the extraction of gray pixels and the addition of the extracted gray pixels to the accumulated gray pixels to execute the setup of the fifth frame and the setting of the image processing condition to the data processing part 54 by using all the gray pixels and the like.

Moreover, in accordance with the setup of the fifth frame, the display processing part 60 reads out the image data of the fifth frame from the FMs 48 while reading out the image processing condition of the same from the setup part 52 to perform the processing in a similar manner, thereby displaying a monitoring image of the fifth frame. Next, the fifth frame undergoes the monitoring. In accordance with the end of monitoring=instruction to output, the data processing part 54 reads out the image data of the fifth frame from the FMs 48 to perform the image processing, thereby sequentially outputting the image data to the printer 16 as image data for printer output.

From thereon, in a similar manner, the setup part 52 reads out the image data of the sixth frame to execute the extraction and the accumulation of gray pixels, the setup of this frame, and the setting of the image processing conditions. Then, the display processing part 60 produces and displays a monitoring image to perform the monitoring. In accordance with an instruction to output, the data processing part 54 performs the image processing on the image data of the sixth frame to output the image data to the printer 16. The seventh frame, the eighth frame and up to the 24th frame are processed in the same manner to output the image data for output to the printer 16.

The above-described example concerns an example where the present invention is applied to the lab system 10 outputting an image only with fine scan and no prescan. The image processing method of the present invention is also suitably applicable to a normal lab system performing fine scan after prescan.

Hereinafter, an example of a normal lab system will be described with reference to FIG. 5.

Also in this example, the prescan and the fine scan are successively executed for all frames (as an example, 24 frames as in the precedent example) as an example.

First, the prescan is sequentially performed from the first frame to extract gray pixels from the image data for prescan (hereinafter, referred to simply as prescan data). Then, the gray pixels are accumulated from the first frame in a similar manner.

In this example, the prescan and the fine scan are successively performed. When the prescan is finished for all frames (from the first frame to the 24th frame), the film is conveyed in a reverse direction to perform the fine scan from the 24th frame.

Also in this example, it is assumed that the number of gray pixels exceeds a predetermined number at the fourth frame. At this time, the setup is sequentially performed from the first frame. When the setup of the fourth frame is completed, a monitoring image is sequentially produced and displayed from the first frame to execute the monitoring.

Upon completion of the monitoring of the first to the fourth frames, the extraction and the accumulation of gray pixels of the fifth frame, and the setup of the fifth frame using all gray pixels are performed. Then, the production of a monitoring image and the monitoring are performed. From thereon, in a similar manner, the setup and the monitoring of the sixth frame, the seventh frame and up to the 24th frame are executed.

When the monitoring of the 24th frame is completed, the image processing of image data of fine scan (hereinafter, referred to simply as fine scan data) of the 24th frame is started to output to the printer 16 as output image data for printing. Then, the image processing of fine scan data of each frame is sequentially performed from the 23rd frame, the 22nd frame and so on if the fine scan is finished for the frame, so that image data is output to the printer 16.

Unlike this example, in the case where the fine scan is started not with the 24th frame but with the first frame (in the case where the order of prescan is identical with that of fine scan), the image processing and the output of the output image data to the printer can be executed sequentially from the frame which has undergone the monitoring and the fine scan, without waiting for the completion of monitoring for all frames.

As is apparent from the above description, according to the present invention, processings such as the setup, the image processing and the monitoring can be performed without waiting for the completion of image reading of all frames either in a system for outputting an image only with fine scan or in an ordinary system performing prescan and fine scan. Therefore, the image reading and these processings can be performed in parallel. In particular, in the case where the monitoring is performed, a time period from the setting of a film to the start of monitoring can be reduced, thereby allowing an efficient output at a good workability.

Moreover, although the setup is started without completing the image reading for all frames, the setup is performed by using image data of a plurality of frames which are acquired up to then, after accumulation of sufficient image data, that is, in the illustrated example, after accumulation of a predetermined number of gray pixels. Therefore, according to the present invention, the appropriate image analysis and setup can be realized. For example, even in the case where the first several frames contain the successive scenes photographed on the lawn, high-quality images can be output without color failure.

In the above-described example, after accumulation of a predetermined number of gray pixels, gray pixels of the following frames are sequentially accumulated. At the final frame, for example, at the 24th frame, the setup is performed by using the gray pixels for 24 frames.

In other words, in terms of accuracy of the setup corresponding to the data accumulation, posterior frames are advantageous over the frame with which the setup starts. Therefore, in some cases, a difference in image quality may be generated between a frame on the head side and a frame on the end side.

In the present invention, in order to prevent the generation of such difference in image quality so as to keep the balance of overall image quality, the number of frames whose gray pixels are accumulated may be fixed.

For example, in the above-described example, the number of gray pixels exceeds a predetermined number at the fourth frame. However, the accumulation of gray pixels may be continued up to the eighth frame, so that the number of frames whose gray pixels are accumulated is set to always eight as in the following manner to perform the setup of each frame: the gray pixels of the first frame are removed when the gray pixels of the ninth frame are to be accumulated, the gray pixels of the second frame are removed when the gray pixel of the tenth frame are to be accumulated, and so on. Alternatively, the gray pixels of a predetermined number of the adjacent frames, i.e., preceding and following frames with respect to the frame which is subjected to setup, may be accumulated, thereby executing the setup.

Figure 4B:
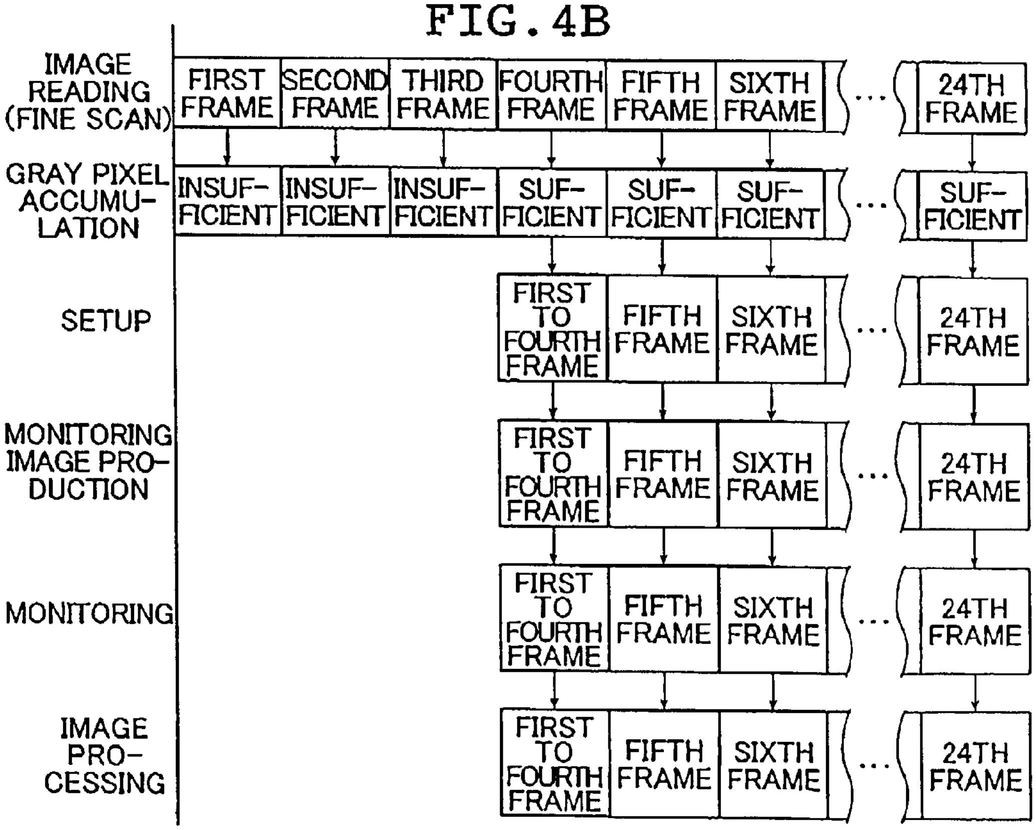
Figure 5:
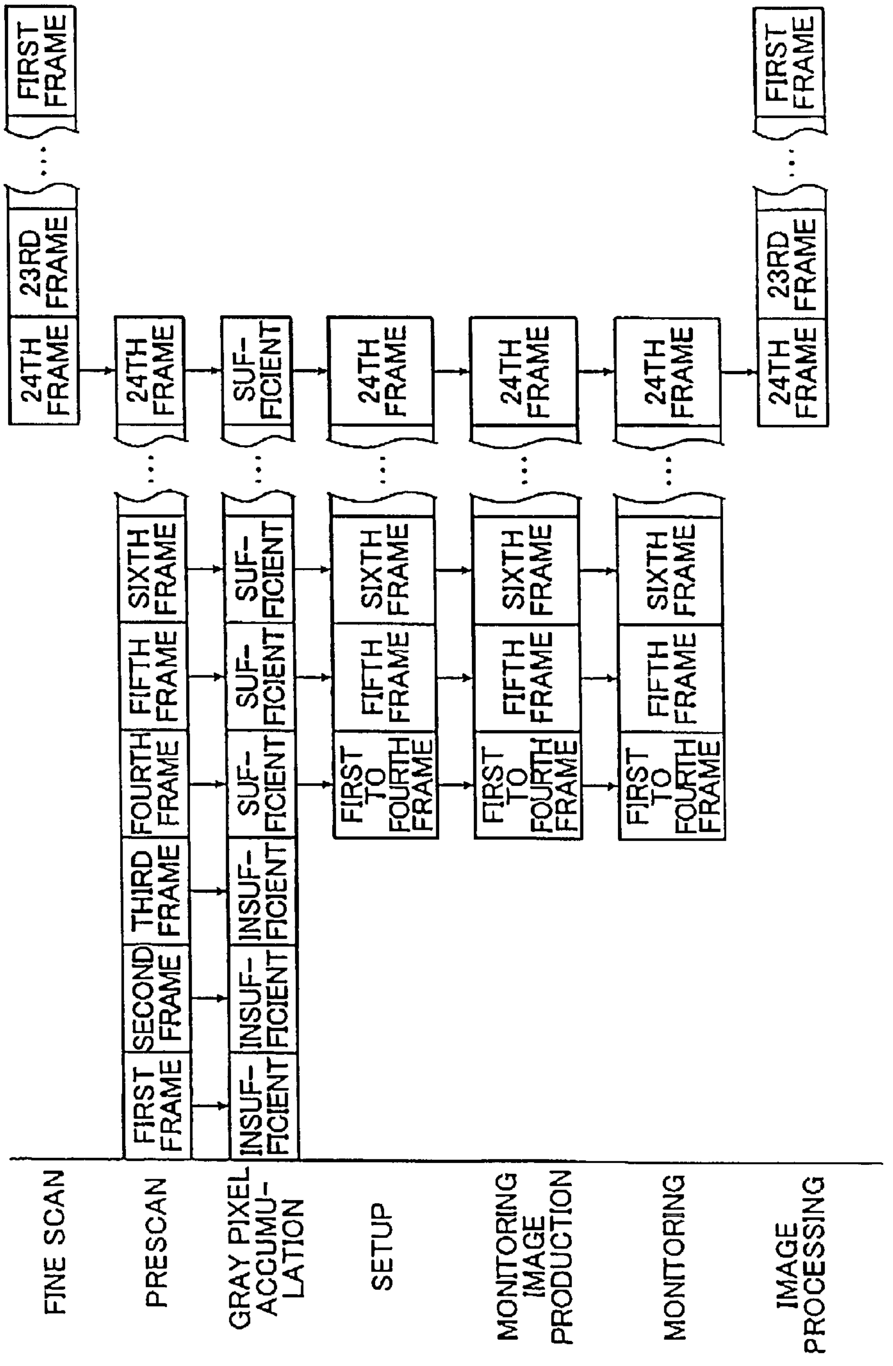
FIG. 5 is a diagram for illustrating another example of a sequence of the image processing method of the present invention.

Further, in the embodiment shown in FIGS. 4A, 4B and 5, at the time when the number of accumulated gray pixels reaches a sufficient number, the setup of the first frame to the fourth frame is performed. Then, the monitoring processing of the first frame to the fourth frame and the image processing of the first frame to the fourth frame are executed. However, the present invention is not limited thereto. At the time when the number of accumulated gray pixels reaches a sufficient number, the setup, the monitoring and the image processing of the first frame may be performed, followed by the sequential processing for each frame, i.e., the setup, the monitoring and the image processing of the second frame, then, the setup, the monitoring and the image processing of the third frame, and so on.

The embodiments described above refer to the case where the setup is started at the time when a predetermined number of gray pixels are accumulated. This is not however the sole case of the present invention. The setup may be started as described above in any one of the following cases: When predetermined pixels in the image data of the image of each frame as accumulated with respect to the density axis have a density range exceeding a predetermined width; when predetermined pixels in the image data of the image of each frame as accumulated with respect to the color distribution axis have a color distribution exceeding a predetermined width; and when the end of a continuous scene is confirmed by the scene analysis of the image data of the image of each frame.

Figure 6A:
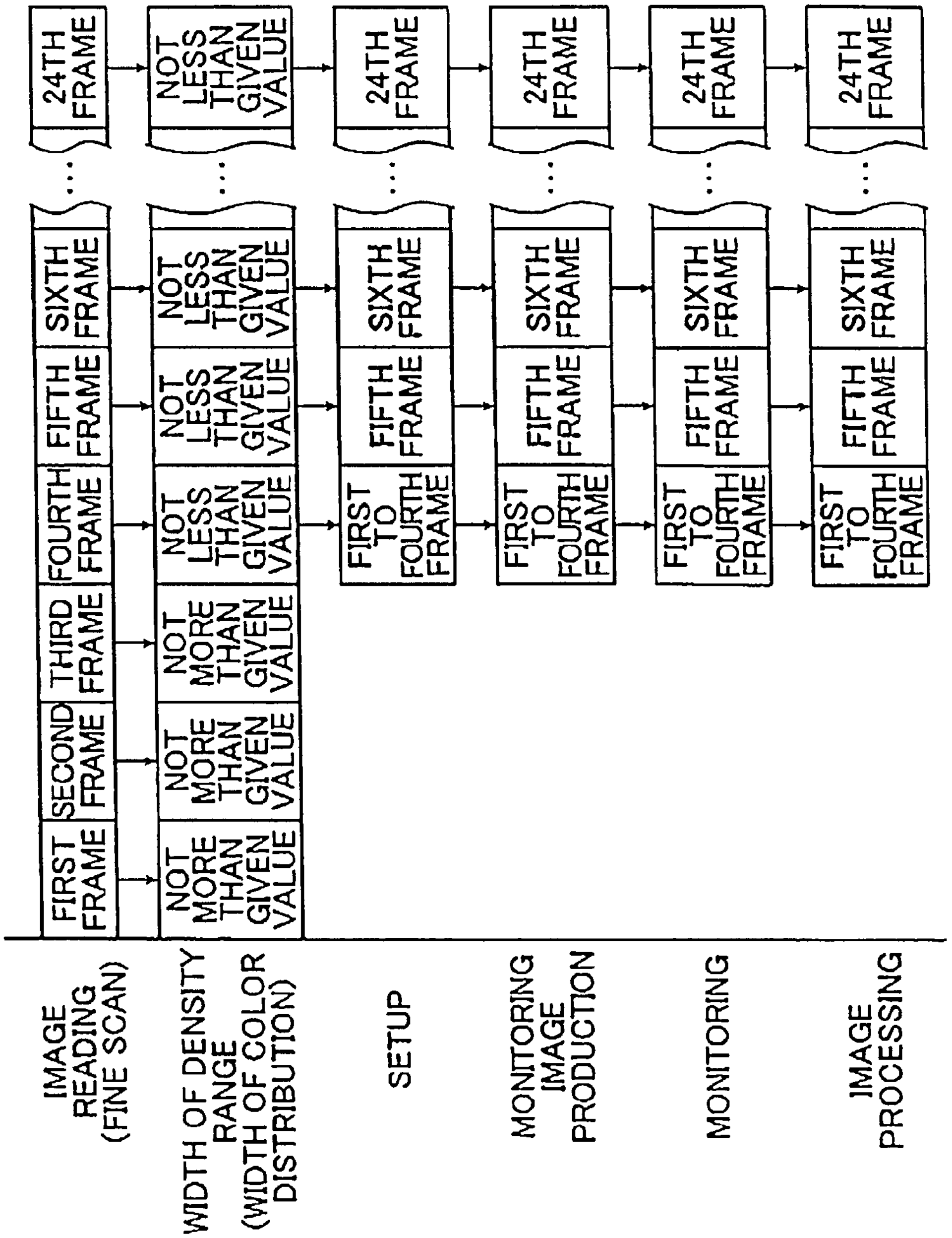
FIGS. 6A and 6B are diagrams for illustrating other examples of a sequence of the image processing method of the present invention.

For example, when monitoring images are displayed in the lab system 10 to monitor the images for adjustment as in the case shown in FIG. 4B, instead of accumulating gray pixels as shown in FIG. 4B, the present invention may accumulate predetermined pixels in the image data of the image of each frame with respect to the density axis or color distribution axis as shown in FIG. 6A.

In this alternative case, the setup of the first frame is performed in the same manner as the above case at the time when the accumulated pixels have a density range or color distribution exceeding a predetermined width, to be more specific, at the time when the pixels accumulated with respect to the density axis or color distribution axis are dispersed at a predetermined degree of dispersion in the density range or color distribution, and in the illustrated case, at the time when the pixels in the image data of the image of the fourth frame as accumulated with respect to the density axis or color distribution axis have a density range or color distribution exceeding a predetermined width.

The accumulated pixels can be considered to have a density range or color distribution exceeding a predetermined width when the degree of dispersion of the density range or color distribution exceeds a predetermined value.

The setup of the first frame is thus started in the same manner as the above case and is completed. Thereafter, the setup is sequentially performed from the second frame through the third frame to the fourth frame.

Then, production of monitoring images, monitoring and image processing are sequentially performed as in the case shown in FIG. 4B from the first frame to the fourth frame and the monitored images are displayed on the display 18. Subsequently, the image data of the first to fourth frames obtained by performing the image processing is sequentially output to the printer 16, from which prints are sequentially output.

The operation is performed in the same manner as in the case shown in FIG. 4B for the fifth frame or subsequent frames.

Figure 6B:
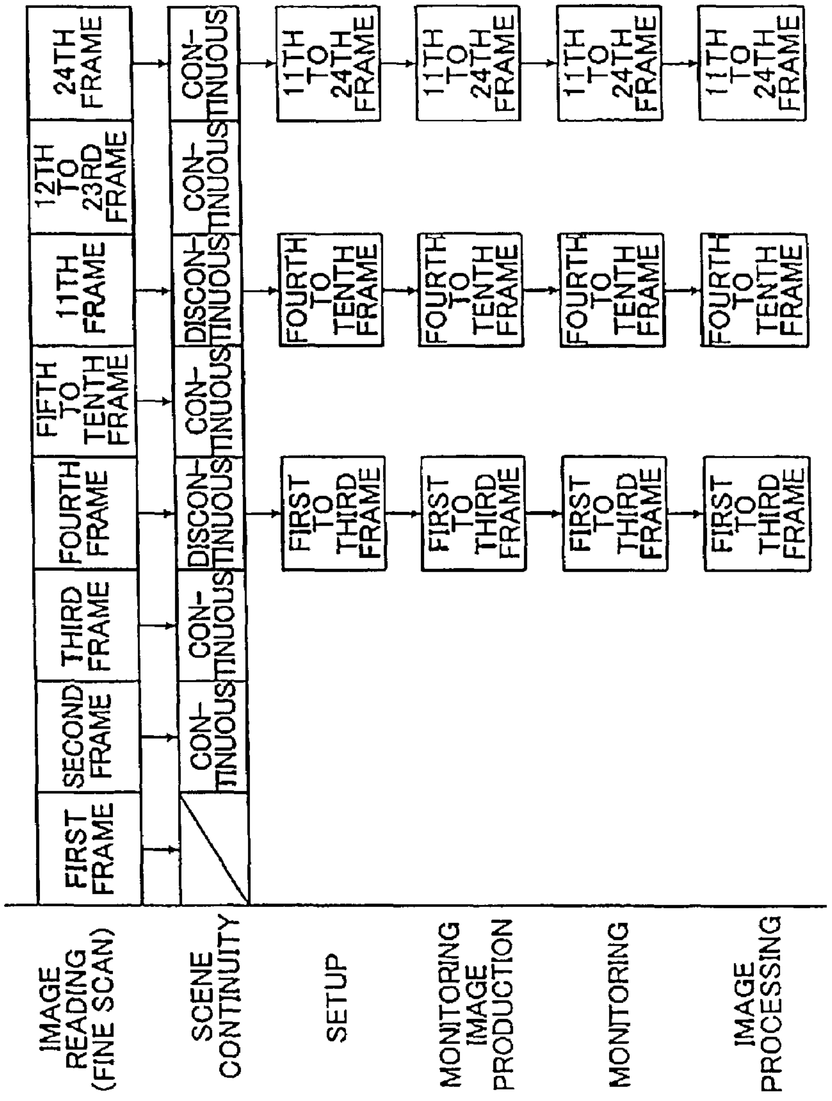

When monitoring images are displayed in the lab system 10 to monitor the images for adjustment as in the case shown in FIG. 4B, the image data scene of the image of each frame may be analyzed in the present invention as shown in FIG. 6B instead of accumulating gray pixels as shown in FIG. 4B.

In this alternative case, at the time when the end of a continuous scene is confirmed as a result of the scene analysis of the image data of the image of each frame, the setup of the first frame is performed in the same manner as in the case described above. In the illustrated case, the image-data scene of the image of the fourth frame has no similarity with the scenes of the first to third frames and the fourth frame is considered to be a frame which provides a discontinuous scene.

The continuity of the scene of the frame image can be evaluated based on the similarity in the image characteristic quantities such as density histogram, average density (LATD (large-area transmission density)), highlight and shadow, to be more specific, based on the time when the difference exceeds a threshold. Then, the setup of the second and third frames is sequentially performed.

Next, production of monitoring images, monitoring and image processing are sequentially performed as in the case shown in FIG. 4B from the first frame to the third frame and the monitored images are displayed on the display 18. Subsequently, the image data of the first to third frames obtained by performing the image processing is sequentially output to the printer 16, from which prints are sequentially output.

Next, the fourth to tenth frames have a continuous scene. The scene of the image data of the eleventh frame has no similarity with the fourth to tenth frames. At that time, the setup of the fourth frame is performed in the same manner and the setup of the fifth to tenth frames is sequentially performed. Thereafter, production of monitoring images, monitoring and image processing are sequentially performed in the same manner from the fourth frame to the tenth frame and the monitored images are displayed on the display 18. Subsequently, the image data of the fourth to tenth frames obtained by performing the image processing is sequentially output to the printer 16, from which prints are sequentially output.

Further, the 11th to 24th frames have a continuous scene. If the 24th frame is the last frame of the film, the continuity ends at the time when the analysis of the image data of the 24th frame is completed. At that time, the setup of the 11th frame is performed in the same manner and the setup of the 12th to 24th frames is sequentially performed. Thereafter, production of monitoring images, monitoring and image processing are sequentially performed in the same manner from the 11th frame to the 24th frame and the monitored images are displayed on the display 18. Subsequently, the image data of the 11th to 24th frames obtained by performing the image processing is sequentially output to the printer 16, from which prints are sequentially output.

In this way, print output of all the frames of the film is completed.

It should be noted here that, when starting the setup at the time when the end of a continuous scene is confirmed as a result of the scene analysis of the image data of the image of each frame as shown in FIG. 6B, if all the 24 frames have a continuous scene, the setup is started at the end of all the 24 frames. Therefore, in this case, this method is preferably combined with another method. To be more specific, this scene analysis is preferably combined with the accumulation of gray pixels or accumulation of pixels with respect to the density axis or color distribution axis to start the setup at the time when the end of a continuous scene is confirmed, at the time when a sufficient number of gray pixels are accumulated, or at the time when the density range or color distribution has a width exceeding a predetermined width.

As described above, in the present invention, it is preferable to start the setup in at least one of the following cases: when a sufficient number of gray pixels are accumulated; when the density range or color distribution has a width exceeding a predetermined width; and when the end of the continuity of a scene is confirmed.

The embodiments described above refer to the case where monitoring is performed in the lab system 10 which performs only fine scan. However, the present invention is not limited to this case but is also applicable to the case shown in FIG. 4A in which image processing is performed in the lab system 10 without monitoring and the case shown in FIG. 5 in which image processing is performed in an ordinary lab system which performs prescan and fine scan.

The image processing method of the present invention has been described above in detail with reference to various embodiments. The present invention is not limited to the above embodiments. It is apparent that various modifications and changes may be possible as long as such modifications and changes do not depart from the gist of the present invention.

As described above in detail, according to the image processing method of the present invention in which the image processing condition of each frame can be determined rapidly in a correct or proper manner in a digital laboratory system or the like, a high-quality image which is not affected by the scenes photographed on the lawn or the like and which is based on the determination of the proper image processing condition can be output, while at the same time the determination of the image processing condition or monitoring can be performed without waiting for completion of image reading for all frames, thereby improving the workability or the productivity of print output or image file output.

What is claimed is:

1. An image processing method comprising the steps of:

successively acquiring image data of images of a plurality of frames;

changing a timing with which determination of an image processing condition is started in accordance with contents of the images carried by the acquired image data;

determining the image processing condition for each image data of the images of said plurality of frames; and performing image processing in accordance with the thus determined image processing condition to output data for output purposes, wherein the determination of the image processing condition of the image data of each of the images of said plurality of frames is started in at least one of four cases: a first case where gray pixels are extracted from the acquired or selected image data of each of the images of the frames for accumulation and the accumulated gray pixels exceed a predetermined number; a second case where predetermined pixels in the image data of each of the images of the frames accumulated with respect to a density axis have a density range exceeding a predetermined width; a third case where predetermined pixels in the image data of each of the images of the frames accumulated with respect to a color distribution axis have a color distribution exceeding a predetermined width; and case where an end of a continuous scene is confirmed as a a fourth result of a scene analysis of the image data of each of the images of the frames.

2. The image processing method according to claim 1, wherein the determination of the image processing condition comprises determination of adjustment of image characteristics comprising at least one of color, density and degradation.

3. The image processing method according to claim 1, wherein the determination of the image processing condition is started if a predetermined characteristic threshold value of the contents of the images is reached.

4. The image processing method according to claim 1, wherein the contents of the images comprise at least one of a number of a predetermined-colored pixel, a density range and a color distribution.

5. The image processing method according to claim 1, wherein the determining of the image processing condition and the image processing is performed frame by frame basis.

6. The image processing method according to claim 1, wherein the image processing of a first frame of said plurality of frames is performed after the determining of the image processing condition for each of said plurality of the frames.

7. The image processing method according to claim 1, wherein the method further comprising:

producing a monitoring image of each of said plurality of frames if the image processing condition has been determined; and monitoring the monitoring image.

8. An image processing method comprising the steps of:

successively acquiring first image data of first images;

selecting second image data of second images of a plurality of frames taken with a photographing device of a single model from the acquired first image data of the first images;

changing a timing with which determination of an image processing condition is started in accordance with contents of the second images carried by the thus selected second image data;

determining the image processing condition for each of said plurality of frames based on said timing using the thus selected second image data of the second images of said plurality of frames; and performing image processing in accordance with the thus determined image processing condition to output data for output purposes.

9. An image processing method comprising the steps of:

performing prescan for photoelectrically reading images of a plurality of frames taken on a photographic film in a rough manner prior to performing fine scan for photoelectrically reading the images of said plurality of frames taken on the photographic film for output purposes to thereby acquire image data of the images of said plurality of frames;

changing a timing with which determination of an image processing condition is started in accordance with contents of the images carried by the acquired image data;

determining the image processing condition for each of said plurality of frames based on said timing using the image data of the images of said plurality of frames acquired by the prescan; and processing fine scan data obtained by the fine scan in accordance with the thus determined image processing condition to output data for output purposes.

10. The image processing method according to claim 9, the method further comprising:

producing a monitoring image of each of said plurality of frames if the image processing condition has been determined; and monitoring the monitoring image of each of said plurality of frames.

11. The image processing method according to claim 10, wherein the processing of the fine scan data is started after completion of the monitoring of a last frame of said plurality of frames, and wherein the processing of the fine scan data is performed in order from the last frame to a first frame of said plurality of frames.

12. The image processing method according to claim 10, wherein the processing of the fine scan data is started in order from a first frame of said plurality of frames to the last frame before the monitoring of the last frame is completed.

13. The image processing method according to claim 8 or 9, wherein the determination of the image processing condition of the image data of each of the images of said plurality of frames is started in at least one of four cases: a first case where gray pixels are extracted from the acquired or selected image data of each of the images of the frames for accumulation and the accumulated gray pixels exceed a predetermined number; a second case where predetermined pixels in the image data of each of the images of the frames accumulated with respect to a density axis have a density range exceeding a predetermined width; a third case where predetermined pixels in the image data of each of the images of the frames accumulated with respect to a color distribution axis have a color distribution exceeding a predetermined width; and case where an end of a continuous scene is confirmed as a a fourth result of a scene analysis of the image data of each of the images of the frames.

14. The image processing method according to claim 13, wherein as for image data acquired or selected after the predetermined number of gray pixels are accumulated, the image processing condition is determined by adding gray pixels of the acquired or selected image data to the gray pixels having been accumulated theretofore, or as for image data acquired or selected after said density range or said color distribution has a width exceeding the predetermined width, the image processing condition is determined by adding predetermined pixels of the image data to the predetermined pixels having been accumulated theretofore.

15. The image processing method according to claim 14, wherein when the gray pixels are accumulated for a predetermined number of frames, gray pixels of one frame having been accumulated theretofore are deleted to accumulate gray pixels of a new frame, or when the predetermined pixels are accumulated with respect to the density axis or the color distribution axis for a predetermined number of frames, pixels of one frame having been accumulated theretofore are deleted to accumulate pixels of a new frame, whereby a number of frames for which pixels used for determining the image processing condition afterwards are accumulated is made constant.

16. The image processing method according to claim 13, wherein the gray pixels of each of the frames are judged by using highlight color balance and shadow color balance of the image data of the frames.

17. The image processing method according to claim 13, wherein the gray pixels of each of the frames are judged by using characteristic information of a photographic film previously given.

18. The image processing method according to claim 13, wherein the width of the density range or the color distribution is evaluated by a degree of dispersion of a number of the pixels accumulated with respect to the density axis or the color distribution axis.

19. The image processing method according to claim 13, wherein the end of the continuous scene of the image data of each of the images of the frames is determined based on a-similarity in a histogram or an average density of the image data of each of the images of the frames.

20. The image processing method according to claim 13, wherein, in the first case, the gray pixels are extracted by thining pixels of the acquired or selected image data to a predetermined size.

21. The image processing method according to claim 13, wherein the predetermined number in the first case, the predetermined width in the second case, or the predetermined width in the third case is set in accordance with a target quality of the images or processing capability of an image processing apparatus employing the image processing method.

22. An image processing apparatus comprising:

a setup unit which successively acquires image data of images of a plurality of frames, changes a timing with which determination of an image processing condition is started in accordance with contents of the images carried by the acquired image data, and determines the image processing condition for each image data of the images of said plurality of frames; and a data processing unit which performs image processing in accordance with the thus determined image processing condition to output data for output purposes, wherein the determination of the image processing condition of the image data of each of the images of said plurality of frames is started in at least one of four cases: a first case where gray pixels are extracted from the acquired or selected image data of each of the images of the frames for accumulation and the accumulated gray pixels exceed a predetermined number; a second case where predetermined pixels in the image data of each of the images of the frames accumulated with respect to a density axis have a density range exceeding a predetermined width; a third case where predetermined pixels in the image data of each of the images of the frames accumulated with respect to a color distribution axis have a color distribution exceeding a predetermined width; and case where an end of a continuous scene is confirmed as a a fourth result of a scene analysis of the image data of each of the images of the frames.

* * * * *